US012237119B2

(12) United States Patent
Zhao

(10) Patent No.: US 12,237,119 B2
(45) Date of Patent: Feb. 25, 2025

(54) RADIO FREQUENCY SWITCH CONNECTOR

(71) Applicants: Fuyu Electronic Technology (Huai'an) Co., Ltd., Huai'an (CN); FOXCONN INTERCONNECT TECHNOLOGY LIMITED, Grand Cayman (KY)

(72) Inventor: Jun Zhao, Huaian (CN)

(73) Assignees: Fuyu Electronic Technology (Huai'an) Co., Ltd., Huai'an (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 109 days.

(21) Appl. No.: 18/145,178

(22) Filed: Dec. 22, 2022

(65) Prior Publication Data

US 2023/0207228 A1 Jun. 29, 2023

(30) Foreign Application Priority Data

Dec. 28, 2021 (CN) ........................ 202123331685.2

(51) Int. Cl.
*H01H 1/58* (2006.01)
*H01H 1/26* (2006.01)
*H01H 9/02* (2006.01)

(52) U.S. Cl.
CPC ............ *H01H 1/5805* (2013.01); *H01H 1/26* (2013.01); *H01H 9/02* (2013.01)

(58) Field of Classification Search
CPC ........... H01H 2013/00; H01H 2013/02; H01H 2013/04; H01H 2013/50; H01H 2013/52; H01H 2205/00; H01H 2205/004; H01H 2207/02; H01H 2223/00; H01H 2223/002; H01H 2223/01; H01H 2223/054; H01H 2229/00; H01H 2229/04; H01H 2001/50; H01H 13/00; H01H 13/04; H01H 13/10; H01H 13/14; H01H 13/48; H01H 2003/12; H01H 2009/02; H01H 1/26; H01H 1/58; H01H 1/50; H01H 1/5805; H01H 9/02; H01H 9/0264; H01H 9/24; H01H 3/12; H01H 3/36; H01H 3/50; H01H 3/52; H01R 13/7033; H01R 24/46; H01R 24/50; H01R 12/57; H01R 2103/00
USPC .......................................................... 200/502
See application file for complete search history.

(56) References Cited

U.S. PATENT DOCUMENTS 7,726,992 B2 * 6/2010 Wang ................. H01R 13/7033
439/944
9,281,639 B2 * 3/2016 Yang ...................... H01R 24/50

FOREIGN PATENT DOCUMENTS

CN 209948178 U 1/2020

* cited by examiner

*Primary Examiner* — Anthony R Jimenez
(74) *Attorney, Agent, or Firm* — Ming Chieh Chang

(57) ABSTRACT

A radio frequency switch connector includes: a metal case; an insulator defining an inserting hole and received in the metal case; an elastic terminal retained to the insulator and having a first soldering portion; and a fixed terminal retained in the insulator and having a second soldering portion, wherein the first soldering portion and the second soldering portion are aligned with each other in a first direction so as to define an imaginary center line in the first direction, the base of the outer case is asymmetrical at two sides of the imaginary center line so as to shift a weight of the radio frequency switch connector.

14 Claims, 6 Drawing Sheets

RADIO FREQUENCY SWITCH CONNECTOR

BACKGROUND OF THE INVENTION

1. Field of the Invention

The present invention relates to a radio frequency switch connector that is easy to be measured for quality and assurance purpose.

2. Description of Related Art

China Utility Patent No. CN209948178U discloses a radio frequency switch connector, which includes an outer case, an internal insulator, an elastic terminal, and a fixed terminal. The internal insulator includes a body and a cylindrical part which extends upwards from the top surface of the body. The body includes a first end surface and a second end surface which are opposite. The first end surface is recessed to form a first receiving cavity for the elastic terminal to be accommodated. The fixed terminal is integrally formed on the body and includes a plate-shaped contact part and a solder leg which extends out of the second end surface. The elastic terminal includes a substrate part, an elastic contact arm formed by extending forwards from the substrate part, protruding tabs formed by extending forwards from the substrate part and positioned at two sides of the elastic contact arm in the second direction, and a solder part formed by extending from the substrate part. The body includes a third end face and a fourth end face which are connected with the first end face and the second end face. The outer case comprises a first side part and a second side part which cover the third end face and the fourth end face. The first side part and the second side part are both provided with solder leg parts which are angled at the bottom of the body. To ensure the fixed and elastic terminals are properly soldered to a printed circuit board (PCB), the solder leg parts of the outer case are designed to be leveled higher, e.g., 0.02 mm, than the solder leg of the fixed terminal and the solder part of the elastic terminal (both at same level). In this design, the solder leg part of either the first side part or the second side part but not both will touch the PCB. This, however, complicates the process of performing CCD (Charge-coupled Device) detection because which one of the two solder leg parts will touch the PCB is unknown beforehand.

SUMMARY OF THE INVENTION

A radio frequency switch connector includes: a metal case; an insulator defining an inserting hole and received in the metal case; an elastic terminal retained to the insulator and having a first soldering portion; and a fixed terminal retained in the insulator and having a second soldering portion, wherein the first soldering portion and the second soldering portion are aligned with each other in a first direction so as to define an imaginary center line in the first direction, the base of the outer case is asymmetrical at two sides of the imaginary center line so as to shift a weight of the radio frequency switch connector.

DETAILED DESCRIPTION OF THE PREFERRED EMBODIMENT

Figure 1:
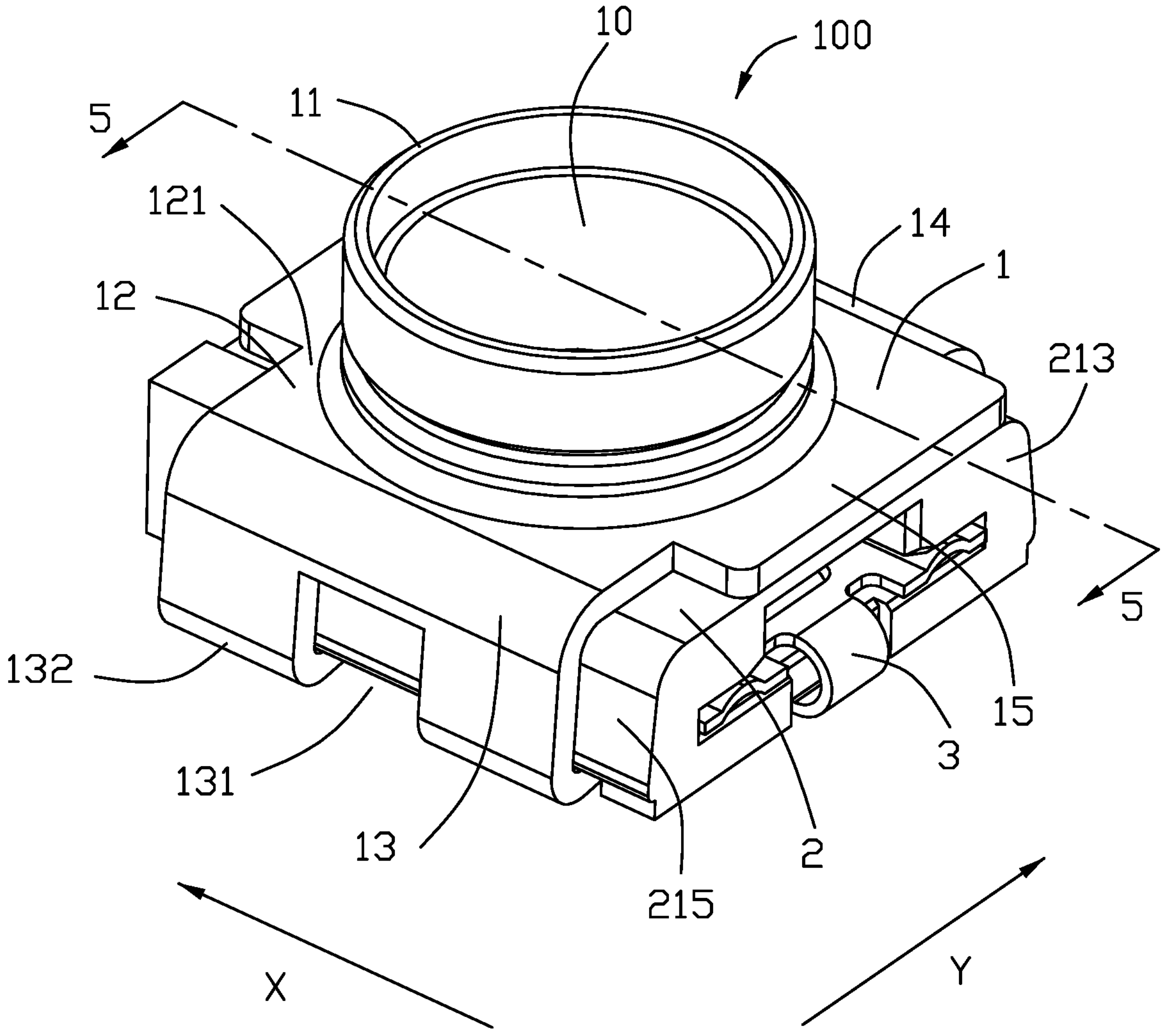
FIG. 1 is a perspective, assembled view of a radio frequency switch connector.
Figure 2:
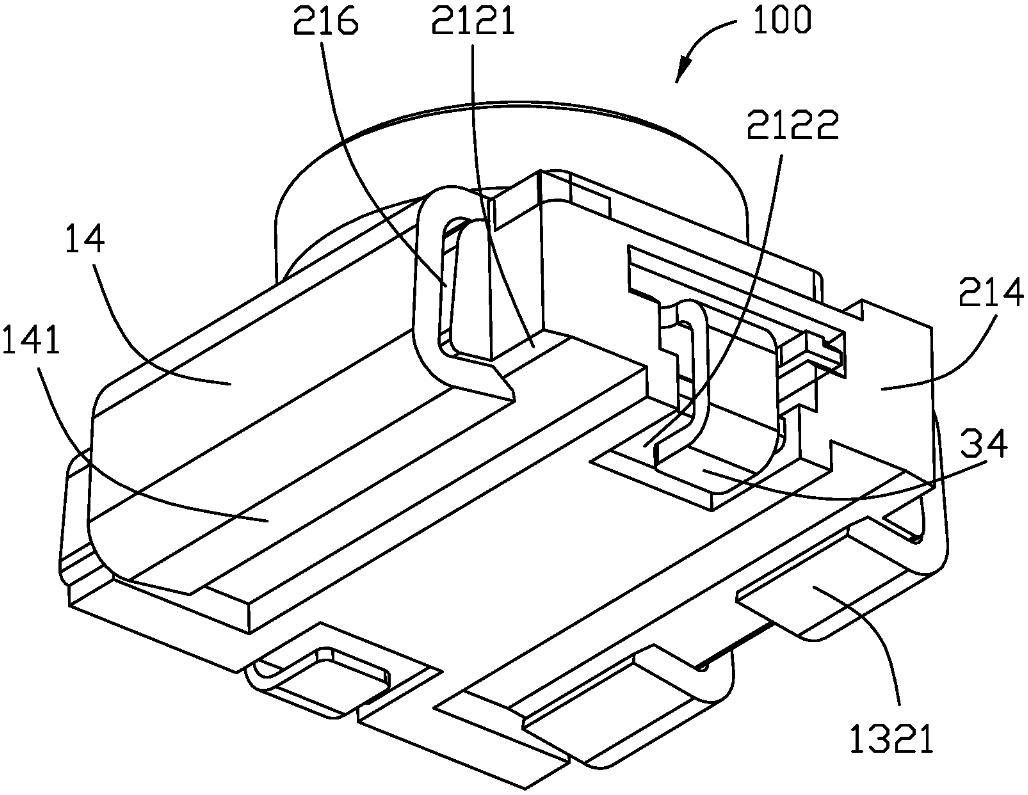
FIG. 2 is another perspective, assembled view of the radio frequency switch connector of FIG. 1.
Figure 3:
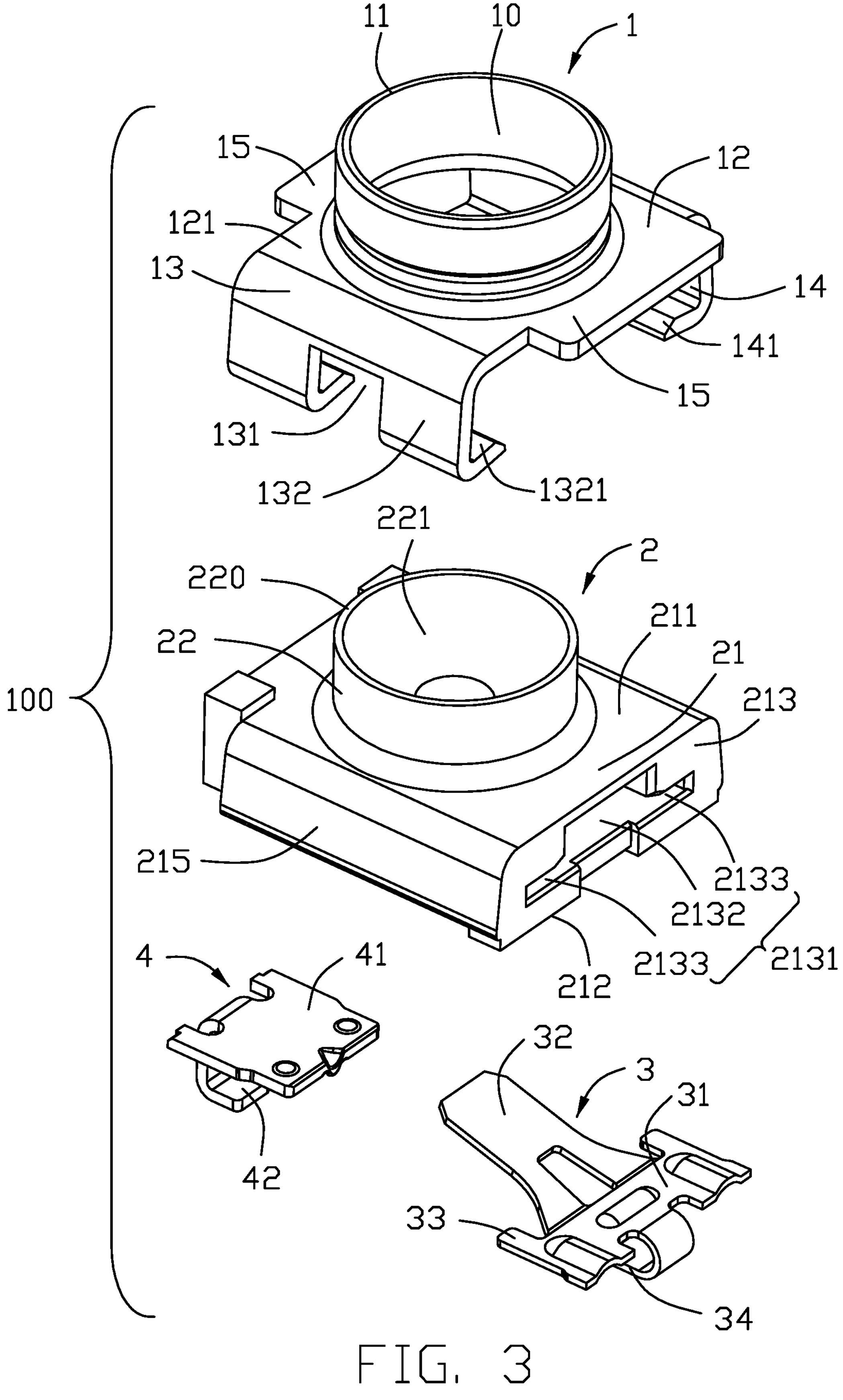
FIG. 3 is an exploded view of the radio frequency switch connector.
Figure 4:
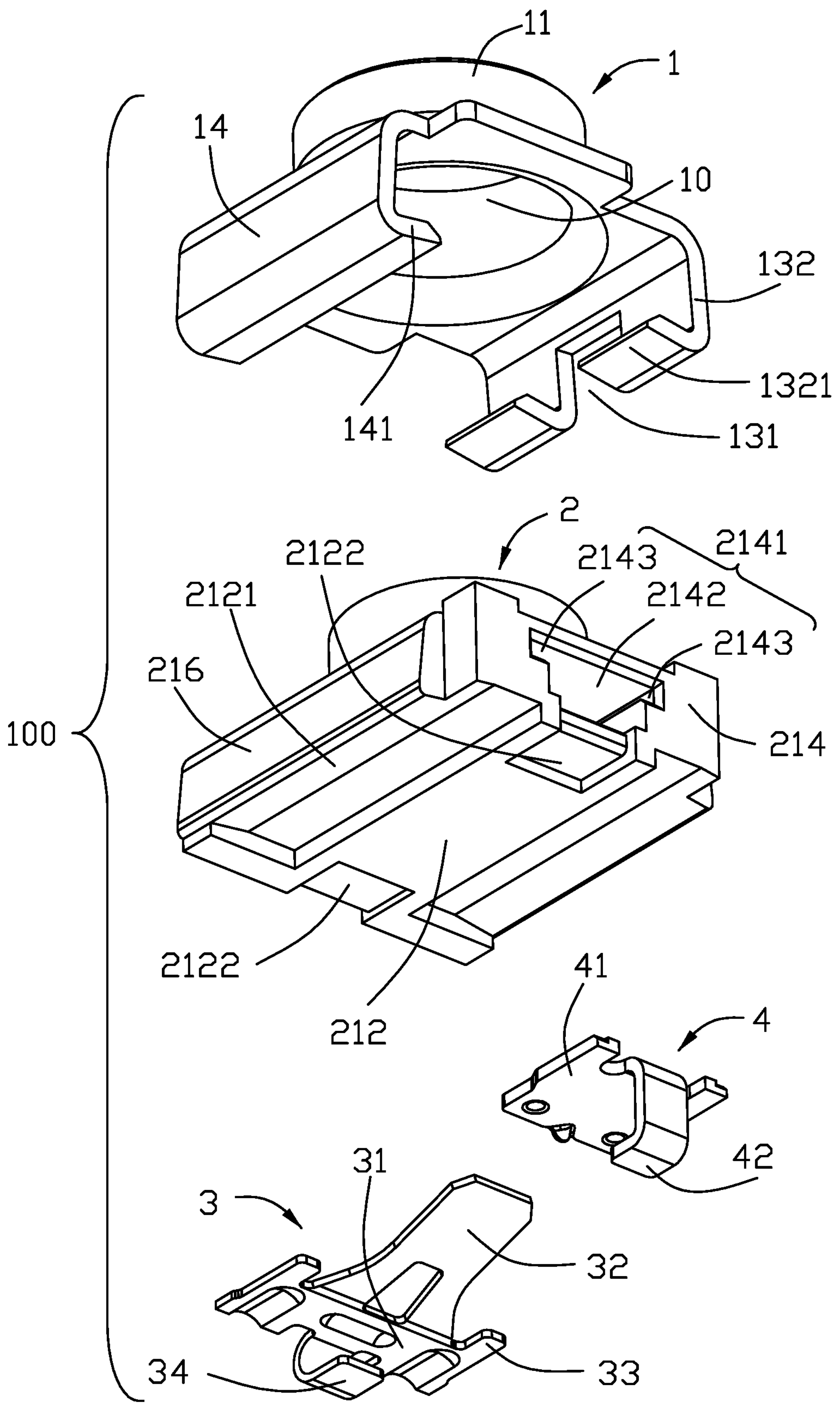
FIG. 4 is another exploded view of the radio frequency switch connector.
Figure 5:
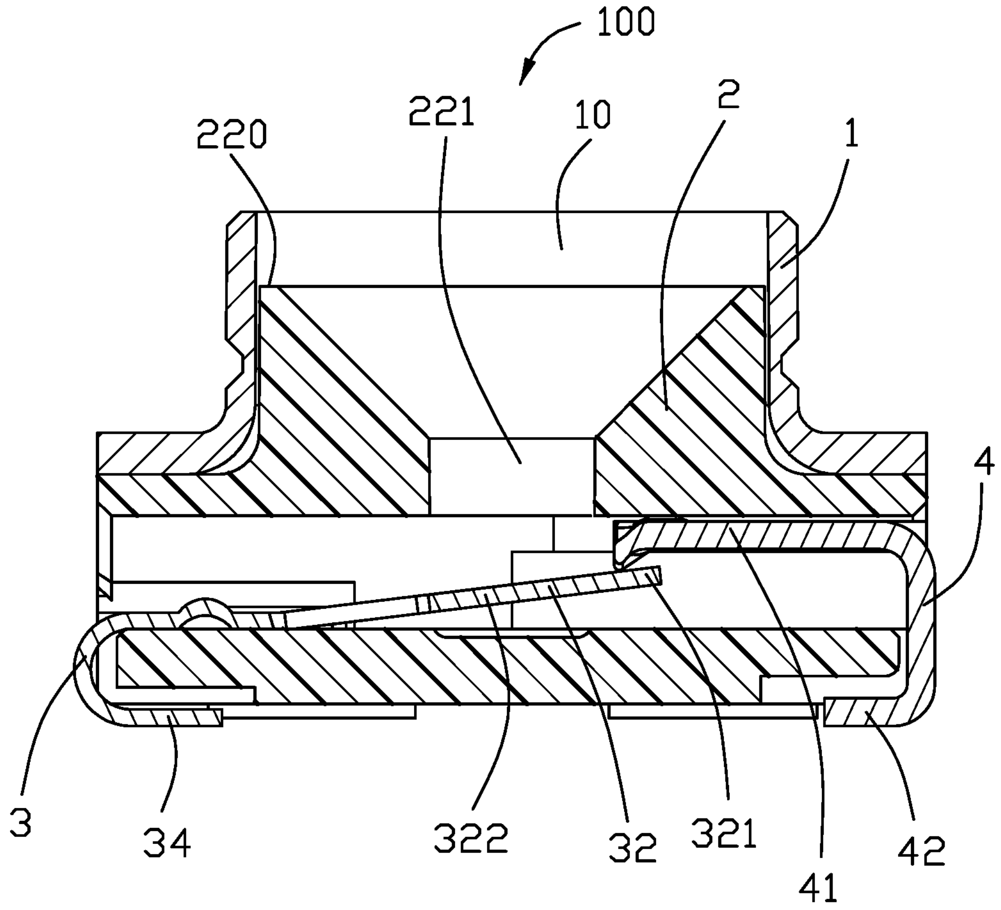
FIG. 5 is a cross-sectional view of the radio frequency switch connector taken along line 5-5 in FIG. 1.
Figure 6:
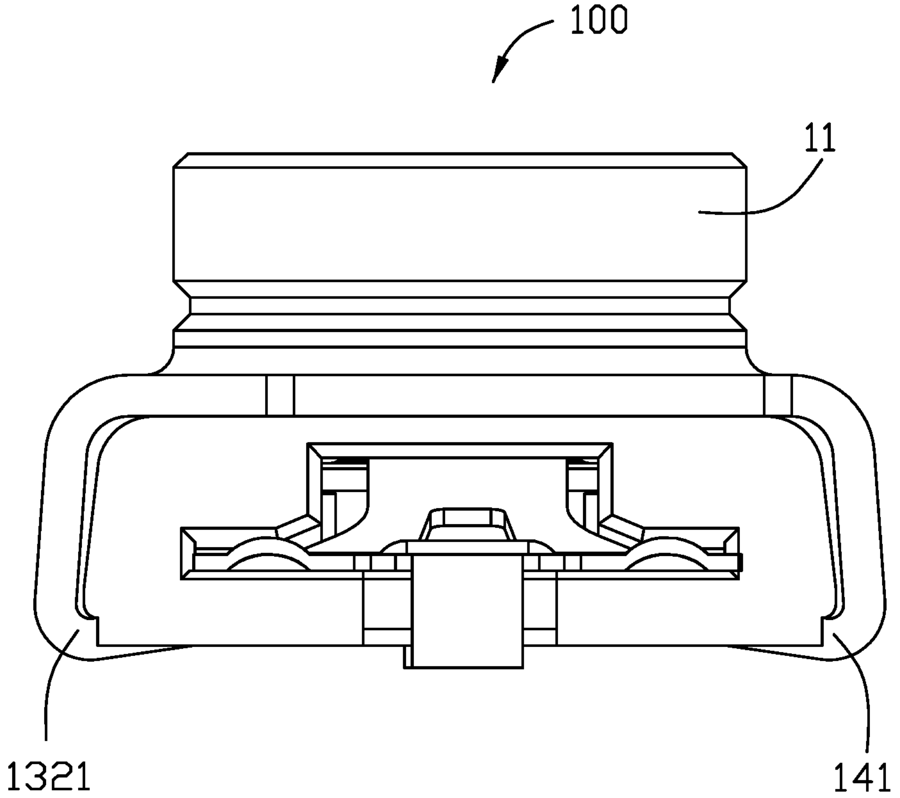
FIG. 6 is a side view of the radio frequency switch connector of FIG. 1.

Referring to FIGS. 1 to 6, a radio frequency switch connector 100 includes an outer case 1, an internal insulator 2, and an elastic terminal 3 and a fixed terminal 4 which are held in the internal insulator 2 and contact with each other in a normal state.

The internal insulator 2 includes a body 21 and a cylindrical portion 22 extending upward from the body 21 and received in a cylindrical portion 22 of the outer case 1. The body 21 comprises a lower surface 212 disposed opposite the upper surface 211. The body 21 defines a first end surface 213 and a second end surface 214 opposite to the first end surface 213 and the second surface 214 respectively, a first receiving chamber 2131 is recessed inward from the first end surface 213 and a second receiving chamber 2141 is recessed inward from the second end surface 214. The first receiving chamber 2131 is communicated with the second receiving chamber 2141. The body 21 further includes a third end surface 215 and a fourth end surface 216 connecting the first end surface 213 and the second end surface 214. A first direction perpendicular to the first end surface 213 and the second end surface 214 is defined, and a second direction perpendicular to the third end surface 215 and the fourth end surface 216 is defined. The cylindrical portion 22 defines an insertion hole 221 formed in a top wall 220 of the cylindrical portion 22 and communicating with the first receiving chamber 2131 in an upper-lower direction or a third direction. The first receiving chamber 2131 includes a first receiving groove 2132 and a pair of second receiving grooves 2133 located on both sides of the first receiving groove 2132 in the second direction and communicating with the first receiving groove 2132. The second receiving groove 2133 is located close to the lower surface 212 of the body 21 in the upper-lower direction. The second receiving chamber 2141 includes a third receiving groove 2142 and a pair of fourth receiving grooves 2143 located at both sides of the third receiving groove 2142 in the second direction and communicating with the third receiving groove 2142. The third receiving groove 2142 is adjacent to the lower surface 212 of the body 21 in the upper-lower direction. The first receiving chamber 2131 formed by the first receiving groove 2132 and the pair of second receiving grooves 2133 are substantially in a shape of a convex, and the second receiving chamber 2141 formed by the third receiving groove 2142 and the pair of fourth receiving grooves 2143 are substantially in a shape of an opposite convex. The lower surface 212 includes a pair of long grooves 2121 extending in the first direction and a short groove 2122 located below the first end surface 213 and the second end surface 214. The pair of short grooves 2122 are located between the two long groove 2121 in the second direction.

The outer case 1 is made from metal plate and includes a base, and a cylindrical portion 11 extending upward from a top surface 121 of the base and surrounding the cylindrical portion 22. The cylindrical portion 11 encloses a receiving space 10 to receive the cylindrical portion 22. The base includes a top plate 12 and a first side plate 13 and a second side plate 14 extending downwards from the top plate 12 and covering the third end surface 215 and the fourth end surface 216. The outer case 1 further includes a pair of shielding portions 15 extending outwards from the top plate 12 in the first direction, the shielding portions 15 are functioned as a weight adding portion which will be described hereinafter. The two shielding portions 15 are simultaneously biased toward the fourth end surface 216, so that the radio frequency switch connector 100 has an asymmetric structure. In the present embodiment, the shielding portions 15 are provided offset toward the fourth end surface 216, e.g., the shielding portions 15 are provided close to the second side plate 14. The second side plate 14 includes a soldering portion 141 bending inwards and abutting against the long grooves 2121 arranged below the fourth end surface 216. The first side plate 13 includes a notch 131, and the pair of shielding portions 15 are disposed close to the second side plate 14, so that the weight of the radio frequency switch connector 100 on the side close to the first side plate 13 is lighter than the weight on the side close to the second side plate 14, so that the radio frequency switch connector 100 is better inclined toward the second side plate 14. The first side plate 13 further defines the notch 131 to reduce weight and a pair of support arms 132 spaced by the notch 131 along the first direction. Each the support arm 132 is provided with one soldering portion 1321 abutting against the long grooves 2121 below the third end surface 215.

The elastic terminal 3 comprises a substrate portion 31 inserted and mounted in the first receiving chamber 2131, an elastic contact arm 32 extending forward from the substrate portion 31 to be exposed to the insertion hole 221 in the upper-lower direction, a pair of retained tabs 33 extending forward from a front end of the substrate portion 31 and spaced apart from both sides of the elastic contact arm 32 in the second direction, and a first soldering portion 34 exposed to a midpoint position of the lower surface 212 provided in the body 21 in the second direction. The first soldering portion 34 is received in the short groove 2122 below the first end surface 213 for being soldered to an external circuit board (not shown). The elastic contact arm 32 is accommodated in the first receiving groove 2132, and the pair of retained tabs 33 are respectively retained in the pair of second receiving grooves 2133. The second receiving grooves 2133 are located close to the lower surface 212 of the body 21 in the upper-lower direction.

The fixed terminal 4 comprises a plate-shaped base 41 fixed in the second receiving chamber 2141 and a second soldering portion 42 extending from the plate-shaped base 41 to the body 21. The plate-shaped base 41 is accommodated and held in the fourth receiving groove 2143. The elastic contact arm 32 includes a contact portion 321 disposed below the plate-shaped base 41 of the fixed terminal 4 and normally contacting the plate-shaped base 41, and a pressing portion 322 exposed to the insertion hole 221. In this embodiment, the first soldering portion 34 and the second soldering portion 42 are aligned with each other in the first direction, and the first and second soldering portions are at a middle point of the lower surface in the second direction. Therefore, the two soldering portions provide an imaginary center line in the first direction.

Understandably, the shielding portions 15 is closer to the fourth end surface 216, the first side plate 13 has cut out with the notch 131 while the second side plate has no notch. The first soldering portion 34 and the second soldering portion 42 are located on the outer sides of the soldering portion 1321, 141 in the first direction. The soldering portion 1321, 141 are located at two opposite sides of the center line in the second direction.

In the prior art, generally, the soldering portions of the elastic terminal and the fixed terminal are located at the middle point in the second direction, and the radio frequency switch connector is also symmetrically arranged in the second direction. The soldering portions of the terminals and the lower surface/the soldering portions of the outer case have a height difference, the connector usually slants slightly to one side in the second direction, that is, in practice, some connectors may slant toward a first side of the center line in the second direction, while some connector may slant toward a second side of the center line opposite to the first side in the second direction. When the radio frequency switch connectors seat on an external circuit board but before being soldered, CCD (Charge-coupled Device) optical measurement is generally required to test the soldering portions of the terminals. It is clear that two optical lens are needed to test the soldering portions since the connectors are uncertain to slant toward which side in the second direction. If the measurement result is greater than 0.1 mm, the radio frequency switch connector is determined to be defective, and if the measurement result is not greater than 0.1 mm, the radio frequency switch connector is determined to be a qualified product. Moreover, the soldering portions of the first side plate and the second side plate affect an illumination of the CCD, making measurement impossible during CCD detection.

In the present invention, the connector 100 is asymmetrical in the second direction, and the connector are pre-designed to slant and confront against the circuit board by lower surface proximate to the fourth end face 216. The second side plate 14 is heavier than the first side plate 13 by means of defining notch 131 on the first side plate 13 to reduce weight of the first side plate 13 and/or adding the shielding portions 15 on the top plate near to the second side plate 14 to add weight. Therefore, the radio frequency switch connector 100 is inclined toward the second side plate 14. Only one CCD optical measurement is required proximate to the first side plate 13. Moreover, the notch 131 and the shielding portions 15 are beneficial to locating the connector on the circuit board in a pre-determined direction.

The invention claimed is:

1. A radio frequency switch connector comprising:
an outer case comprising a base and a cylindrical portion extending upward from the base;
an internal insulator comprising a body and a cylindrical portion extending upward from the body and received in the cylindrical portion of the outer case, the body defining a first end surface and a second end surface opposite to the first end surface and a third end surface and a fourth end surface connected with the first end surface and the second end surface respectively, and a first receiving chamber recessed inward from the first end surface and a second receiving chamber recessed inward from the second end surface;
an elastic terminal received in the first receiving chamber and comprising a first soldering portion; and
a fixed terminal received in the second receiving chamber and contacting with the elastic terminal in a normal state, the fixed terminal comprising a second soldering portion;
wherein the first soldering portion and the second soldering portion are soldered to a circuit board and are aligned with each other in a first direction so as to define an imaginary center line in the first direction, the base of the outer case is asymmetrical at two sides of the imaginary center line so as to tilt to a preselected one side of the two sides with respect to the imaginary center line.

2. The radio frequency switch connector as claimed in claim 1, wherein one side of the two sides of the base of the outer case in a second direction perpendicular to the first direction is heavier than another side of the base.

3. The radio frequency switch connector as claimed in claim 1, wherein the cylindrical portion of the internal insulator defines an insertion hole communicating with the first receiving chamber, the first receiving chamber includes a first receiving groove and a pair of second receiving grooves located on both sides of the first receiving groove in the second direction and communicating with the first receiving groove, the elastic terminal comprises a substrate portion with two retained tabs retained in the second receiving groove and an elastic contact arm extending forward from the substrate portion and received in the first receiving groove and exposed to the insertion hole.

4. The radio frequency switch connector as claimed in claim 3, wherein the fixed terminal comprises a plate-shaped base fixed in the second receiving chamber and the second soldering portion extends from the plate-shaped base to the body, and the elastic contact arm includes a contact portion disposed below the plate-shaped base of the fixed terminal and normally contacting the plate-shaped base and a pressing portion exposed to the insertion hole.

5. The radio frequency switch connector as claimed in claim 1, wherein the base of the outer case comprises a top plate and two side plates bending from the top plate with two soldering portions, a pair of shielding portions extending outward from the top plate in the first direction, and each shielding portion is biased toward a same side of the imaginary center line.

6. The radio frequency switch connector as claimed in claim 5, wherein the two side plates cover the third end surface and the fourth end surface, respectively, and the side plate covering the third end surface further defines a notch to reduce weight.

7. The radio frequency switch connector as claimed in claim 6, wherein the body of the internal insulator defines two long grooves extending in the first direction and arranged in a second direction perpendicular to the first direction and two short grooves arranged in the first direction at a lower surface thereof, the two short grooves are located between the two long grooves, the soldering portions of the side plates abut against the long grooves, and the soldering portions of the terminals abut against the short grooves.

8. A radio frequency connector comprising:

a metal case comprising a base and a cylindrical portion extending upward from the base;

an insulator received in the metal case and comprising a body and a cylindrical portion extending upward from the body with an inserting hole;

an elastic terminal retained to the insulator and comprising a first soldering portion; and a fixed terminal retained in the insulator and comprising a second soldering portion;

wherein the first soldering portion and the second soldering portion are soldered to a circuit board and are coplanar and aligned with each other in a first direction to define an imaginary center line, the base of the metal case has two coplanar bottom surfaces located on two opposite sides of the imaginary center line in a second direction perpendicular to the first direction, and the base is weighted to tilt to one side with respect to the imaginary center line.

9. The radio frequency connector as claimed in claim 8, wherein the base of the metal case at a first side of the center line is cut to reduce weight.

10. The radio frequency connector as claimed in claim 8, wherein the base comprises a top plate and two side plates bending from the top plate, and only a first side plate of the two side plates at a first side of the center line has a notch.

11. The radio frequency connector as claimed in claim 8, wherein the base comprise a top plate, two side plates bending from the top plate, and two portions extending from the top plate in the first direction, the two portions are located offset toward one side plate at a first side of the center line to add weight.

12. A radio frequency switch connector adapted for mounting on a circuit board, the connector defining a bottom face for confronting the circuit board and comprising:

a metal case;

an insulator defining an inserting hole and received in the metal case;

an elastic terminal retained to the insulator and comprising a first soldering portion; and a fixed terminal retained in the insulator and comprising a second soldering portion;

wherein the first soldering portion and the second soldering portion seat on the circuit board and a first side of the bottom face leans against the circuit board while a second side of the bottom face opposite the first side is spaced a distance from the circuit board.

13. The radio frequency connector as claimed in claim 12, wherein a portion of the metal case proximate to the second side of the bottom face is cut out.

14. The radio frequency connector as claimed in claim 12, wherein a portion of the metal case proximate to the first side of the bottom face is added weight.

* * * * *